United States Patent [19]

McKeown

[11] 3,975,855
[45] Aug. 24, 1976

[54] TELESCOPIC SPIN/FLY COMBINATION FISHING ROD

[75] Inventor: James Edward McKeown, Naperville, Ill.

[73] Assignee: Trimarc Corporation, Hillside, Ill.

[22] Filed: May 30, 1975

[21] Appl. No.: 582,158

[52] U.S. Cl. .................................................. 43/23
[51] Int. Cl.² .................................................. A01K 87/00
[58] Field of Search .................. 43/23, 18, 20, 22

[56] References Cited
UNITED STATES PATENTS

| | | | |
|---|---|---|---|
| 583,016 | 5/1897 | Bacon | 43/23 |
| 814,321 | 3/1906 | Pepper, Jr. | 43/18 R |
| 828,557 | 8/1906 | Levison | 43/23 |
| 1,587,446 | 6/1926 | Viers | 43/23 |
| 2,578,663 | 12/1951 | Beaupre | 43/23 |

*Primary Examiner*—Warner H. Camp
*Attorney, Agent, or Firm*—Olson, Trexler, Wolters, Bushnell & Fosse, Ltd.

[57] ABSTRACT

A combination fishing rod has a plurality of hollow, tubular rod elements telescopically secured into a hollow handle and collapsed substantially completely into the handle for storing. A removable handle and reel seat member is frictionally held onto the handle section of the telescopic rod elements. The removable handle and reel seat are secured to the rod elements in one orientation to form a spinning rod and in another orientation to form a fly-casting rod. The removable handle and reel seat element is held to the fishing rod by sliding frictional engagement.

8 Claims, 4 Drawing Figures

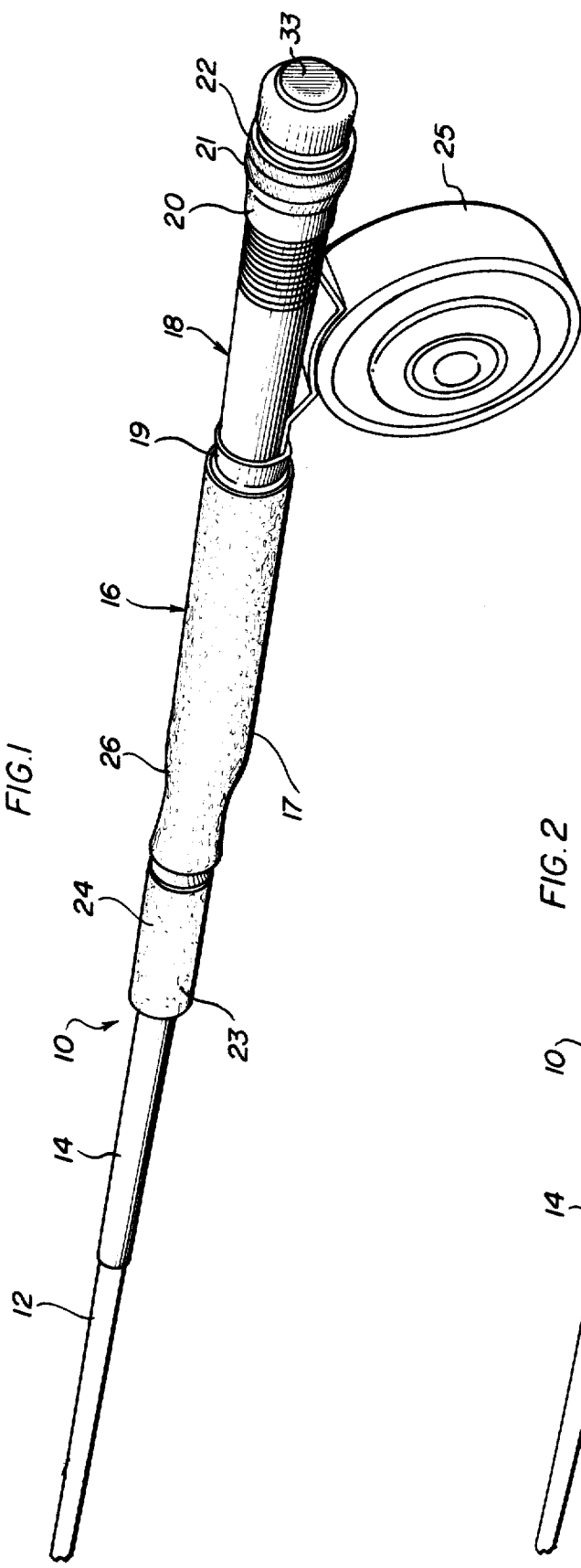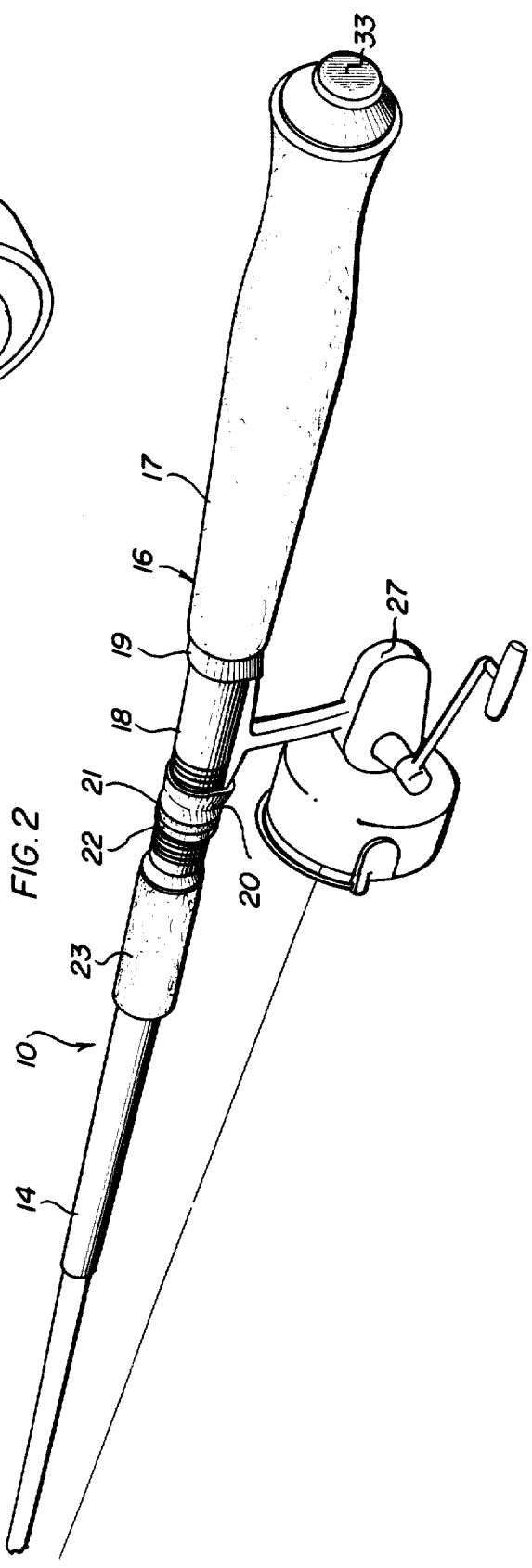

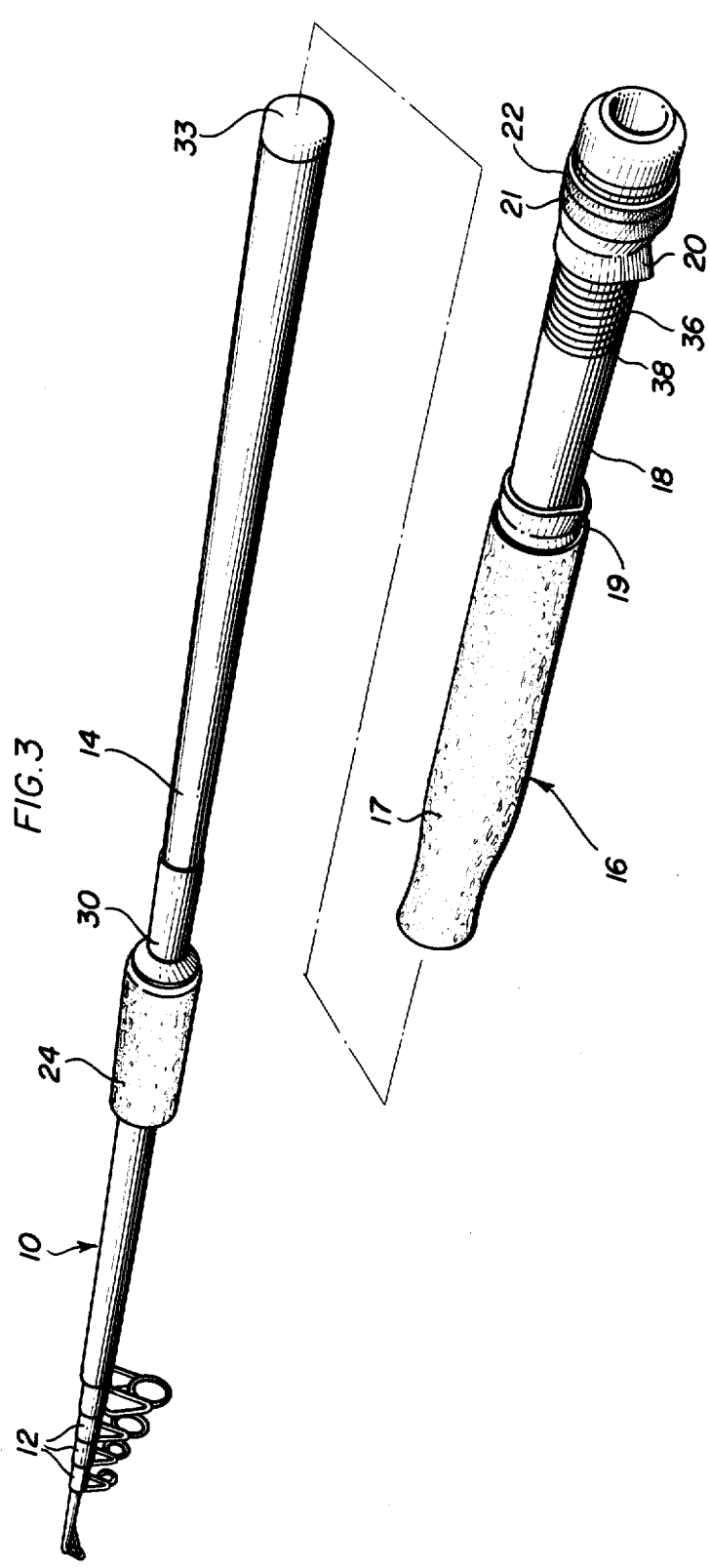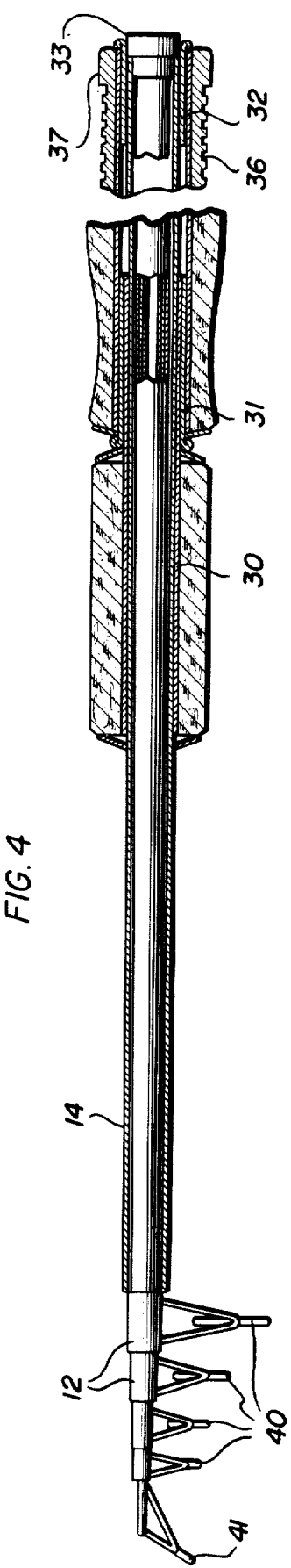

TELESCOPIC SPIN/FLY COMBINATION FISHING ROD

BACKGROUND OF THE INVENTION

This invention relates generally to fishing rods, and more particularly to fishing rods having a plurality of hollow, tubular rod elements telescopically arranged for movement inwardly and outwardly relative to one another. Specifically, the invention disclosed herein is directed to a combination fishing rod which can be used for both spinning and fly-casting.

Heretofore, fishing rods of various configurations have been proposed to enable the user to reduce the overall size of the rod when it is not being used for fishing. One example of such a fishing rod incorporates a short rod element foldable against a handle-reel section. The handle is equipped with means for containing fishing tackle and the like. This type of fishing rod has the advantage of being small and compact when not in use. However, a disadvantage of this type of fishing rod is that it does not have the flex and feel generally associated with a lightweight fiberglass or wood fishing rod.

Another approach to minimize the space required of fishing rods while not in use is to provide a plurality of telescopic sections movable relative to one another. The telescopic sections are extended to provide a long, flexible fishing rod during one instance and then collapsed to provide a short assemblage of parts for storage during another instance. However, even when collapsing a plurality of rod sections, prior art structures require a handle section to be separate and distinct from the plurality of telescopic rod sections. Furthermore, in some instances the handle is completely removed from the plurality of rod sections to provide a two piece unit, one piece being the handle and the other piece being the plurality of collapsed rod sections. While this has the advantage of providing a small compact arrangement for storage it does, in some instances, offer a problem with regard to having one of the two pieces misplaced.

Still another problem with the prior art fishing rods is that they are unitary in function. A fisherman utilizes one type of rod configuration for spinning, and another type of rod configuration for fly-casting. Many fishermen do both types of sport fishing and therefore are required to have two different types of fishing rods available.

SUMMARY OF THE INVENTION

In accordance with the broad aspects of this invention, a combination fishing rod is provided which enables the user to use the rod as the spinning rod in one instance and as a fly-casting rod during another instance.

Another object of this invention is to provide a combination fishing rod which includes a plurality of telescopic rod elements collapsible into the handle section to provide a more compact fishing rod arrangement.

Still another object of this invention is to provide a fishing rod with means for changing the handle configuration thereof so as to be capable of receiving a spinning reel when the rod is to be used as a spinning rod and a fly reel when the rod is to be used as a fly-casting rod.

Briefly, the combination fishing rod of this invention includes a plurality of hollow, tubular rod elements telescopically arranged for movement inwardly and outwardly relative to one another, with the outermost element forming a handle-receiving section. The remaining tubular rod elements are collapsible into the handle-receiving section to form a compact unit. The outermost rod element has a removable handle frictionally engaged therewith. The removable handle has a hand gripping portion formed at one end and a reel seat portion formed at the other end thereof. When the removable handle is secured to the fishing rod with the reel seat thereof intermediate the handle section, the rod is used as a spinning rod. To change the configuration of the rod, the handle is removed and replaced with the reel seat section or a portion thereof at the end or rear of the handle section. A fly-casting reel is then secured to the reel seat and is positioned behind the hand as is customary for this type of fishing.

Many other objects, features and advantages of this invention will be more fully realized and understood from the following detailed description when taken in conjunction with the accompanying drawings wherein like reference numerals throughout the various views of the drawings are intended to designate the similar elements or components.

BRIEF DESCRIPTION OF THE DRAWINGS

FIG. 1 illustrates the handle section of a combination fishing rod constructed in accordance with this invention and is here illustrated in the fly-casting configuration;

FIG. 2 illustrates the casting rod of this invention with the handle secured to the rod elements in a spinning rod configuration;

FIG. 3 is an exploded perspective view showing the removable handle removed from the handle-receiving tubular section of the fishing rod of this invention; and FIG. 4 is a fragmentary sectional view illustrating that the plurality of telescopic elements are positioned completely within the handle forming section of the fishing rod.

DETAILED DESCRIPTION OF THE ILLUSTRATED EMBODIMENT

Referring now to FIG. 1 there is seen a combination fishing rod constructed in accordance with the principles of this invention and designated generally by reference numeral 10. The fishing rod 10 includes a plurality of hollow, tubular rod elements 12 telescopically arranged for movement inwardly and outwardly relative to one another. The telescopic rod elements 12 are inserted into a handle-receiving section 14 which also forms the outermost rod element for the telescopic arrangement. In accordance with one aspect of this invention, the telescopic rod elements 12 are completely insertable into the handle-receiving rod element 14. This provides a compact unit when the fishing rod is collapsed for storage.

A removable handle 16 is secured to the rod section 14 by frictional engagement, to be described in more detail hereinbelow. The removable handle is shown in the fly-casting rod configuration in FIG. 1. The removable handle 16 includes a hand gripping portion 17 and a reel seat portion 18. The reel seat portion 18 includes a fixed collar 19 at one end thereof and a movable collar 20 cooperable with a pair of lock nuts 21 and 22 which are used to hold fly reel 25 to the reel seat in a conventional and well-known manner. In the embodiment shown in FIG. 1, the hand gripping portion 17 cooperates with a stop element 23 which is permanently secured to the rod portion 14. The stop element provides two functions. One is to limit the extent of axial movement of the handle section 16, and the other is to provide an extended hand gripping portion for the rod when used as a fly-casting rod. The stop element 23 has a cork outer jacket 24 of substantially the same diameter as the cork outer jacket 26 of the removable handle 16. Any suitable fly reel 25 can be used with the combination fishing rod of this invention. The variations in reel weight can be compensated for to the particular user's likes by gripping the fly rod along the extended hand gripping section formed by portions 17 and 23.

FIG. 2 illustrates the combination fishing rod 10 in the spinning rod configuration. The removable handle 16 is shown in a reversed configuration with the hand gripping portion 17 at the rearmost end of the fishing rod and the reel seat portion 18 at an intermediate portion of the handle section. A spinning reel 27 is shown held in position by the collars 19 and 20 and securely locked by lock nuts 21 and 22 in a well-known and conventional manner.

FIG. 3 best illustrates the means by which the removable handle 16 is changed from one configuration to the other. Here the fishing rod is shown with the removable handle removed from the handle-receiving rod element 14. The stop member 24 provides an abutment for the handle, as best seen in FIG. 4, when the handle is in a full on position. The handle 16 can be slid over the handle-receiving rod section 14 in either orientation. A fixed sleeve element 30 is secured immediately adjacent the stop 24 and cooperates with a second sleeve 31, FIG. 4, internally of the removable handle to provide friction lock means therebetween. A second internal sleeve 32 is formed at the other end of the handle and cooperates with a resilient bumper element 33 secured to the terminating end of the handle-receiving rod section 14. As best seen in FIG. 3, the bumper element has a diameter which is slightly larger than the diameter of the fiberglass rod element 14. The bumper, therefore, also provides a gasket to seal the internal portion of the removable handle 16 and prevent moisture from getting therein.

The reel seat portion 18 has a threaded section 36 extending from a collar 37 to an intermediate point 38 along the reel seat. The length of threads provided on the reel seat is selected to accommodate reels of various sizes, as well as reels of both the spinning and fly-casting types. The plurality of telescopic rod elements 12 are provided with eyelets 40 in a conventional manner with the endmost telescopic element having an eyelet 41 angled outwardly in a well-known manner. The plurality of telescopic elements can be formed of any suitable flexible material such as fiberglass or the like. Furthermore, other handle configurations can be incorporated if desired.

While a single specific embodiment of the present invention has been illustrated herein, it will be understood that variations and modifications may be effected without departing from the spirit and scope as set forth in the following claims.

The invention is claimed as follows:

1. A combination fishing rod comprising; a plurality of hollow, tubular rod elements telescopically arranged for movement inwardly and outwardly relative to one another, the outermost rod element forming a handle-receiving section with the remaining tubular rod elements being insertable into said handle-receiving section, a removable handle positionable on said handle-receiving section, said removable handle having a hand gripping portion formed at one end thereof and a reel seat portion formed at the other end thereof, said removable handle being placed on said handle-receiving section in a first orientation to form a spinning rod and adapted to be removed and replaced on said handle-receiving section in a second orientation to form a fly-casting rod, said handle-receiving section including a first sleeve formed intermediate the ends thereof, a second sleeve on said removable handle and cooperable with said first sleeve for frictional sliding engagement therewith and for releasably securing said removable handle to said handle-receiving section, a resilient member at an end of said handle-receiving section, said resilient member having a diameter slightly larger than the diameter of said handle-receiving section and engageable with said second sleeve means to form a friction fit therewith.

2. A combination fishing rod as set forth in claim 1 wherein said handle-receiving section includes stop means to limit the extent said removable handle can be pushed over said handle-receiving section.

3. A combination fishing rod as set forth in claim 2 wherein said stop means forms a first hand gripping portion, and said removable handle forms a second hand gripping portion cooperable therewith when in a fly-casting rod configuration.

4. A combination fishing rod as set forth in claim 1 wherein said resilient member extends beyond said removable handle when said handle is secured to said handle-receiving section, said resilient member thereby forming a bumper element at the end of said fishing rod.

5. A combination fishing rod comprising, a flexible rod, handle-receiving means formed at one end of said rod, a removable handle positionable over said handle-receiving means, said removable handle having a hand gripping portion formed at one end thereof and a reel seat portion formed at the other end thereof, said removable handle being placed on said handle-receiving means in a first orientation to form a fly-casting rod and adapted to be removed and replaced on said handle-receiving means in a second orientation to form a fly-casting rod, said handle-receiving section including a first sleeve formed intermediate the ends thereof, second sleeve means on said removable handle and cooperable with said first sleeve for frictional sliding engagement therewith and for releasably securing said removable handle to said handle-receiving means, a resilient member at an end of said handle-receiving section, said resilient member having a diameter slightly larger than the diameter of said handle-receiving section and engageable with said second sleeve means to form a friction fit therewith.

6. A combination fishing rod as set forth in claim 5 wherein said handle-receiving section includes stop means to limit the extent said removable handle can be pushed over said handle-receiving section.

7. A combination fishing rod as set forth in claim 6 wherein said stop means forms a first hand gripping portion, and said removable handle forms a second hand gripping portion cooperable therewith when in a fly-casting rod configuration.

8. A combination fishing rod as set forth in claim 5 wherein said resilient member extends beyond said removable handle when said handle is secured to said handle-receiving section, said resilient member thereby forming a bumper element at the end of said fishing rod.

* * * * *